US012574915B2

(12) United States Patent
Göktepe et al.

(10) Patent No.: US 12,574,915 B2
(45) Date of Patent: Mar. 10, 2026

(54) SPS OR CG DEACTIVATION FOR REDCAP DEVICES

(71) Applicant: Fraunhofer-Gesellschaft zur Förderung der angewandten Forschung e.V., Munich (DE)

(72) Inventors: Baris Göktepe, Berlin (DE); Jasmina Mcmenamy, Berlin (DE); Sarun Selvanesan, Berlin (DE); Thomas Fehrenbach, Berlin (DE); Thomas Wirth, Berlin (DE); Thomas Schierl, Berlin (DE); Cornelius Hellge, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 348 days.

(21) Appl. No.: 18/158,171

(22) Filed: Jan. 23, 2023

(65) Prior Publication Data

US 2023/0164765 A1 May 25, 2023

Related U.S. Application Data

(63) Continuation of application No. PCT/EP2021/070564, filed on Jul. 22, 2021.

(51) Int. Cl.
_H04W 72/11_ (2023.01)
_H04W 72/12_ (2023.01)

(52) U.S. Cl.
CPC ............ _H04W 72/11_ (2023.01); _H04W 72/12_ (2013.01)

(58) Field of Classification Search
CPC ............... H04B 17/327; H04B 17/336; H04W 28/0221; H04W 28/0231; H04W 28/0268; H04W 52/02; H04W 52/0216; H04W 52/0245; H04W 52/0258; H04W 52/281; H04W 72/1242; H04W 72/1268;
(Continued)

(56) References Cited

U.S. PATENT DOCUMENTS

| | | | |
|---|---|---|---|
| 2012/0314680 A1 | 12/2012 | Kela | |
| 2018/0070367 A1 | 3/2018 | Fujishiro et al. | |
| 2019/0045507 A1* | 2/2019 | Sorrentino | ........ H04W 72/1268 |

(Continued)

FOREIGN PATENT DOCUMENTS

| | | |
|---|---|---|
| CN | 109076590 A | 12/2018 |
| EP | 3823397 A1 | 5/2021 |
| WO | 2011/104417 A1 | 9/2011 |

OTHER PUBLICATIONS

3GPP Draft; R1-1806030, ZTE: "Remaining issues for UL data transmission procedure", vol. RAN WG 1 Meeting #93, May 21-25, 2018, Busan, Korea.

(Continued)

*Primary Examiner* — Rushil P. Sampat
(74) *Attorney, Agent, or Firm* — Bridgeway IP Law Group, PLLC; Jihun Kim

(57) ABSTRACT

A user device, UE, for a wireless communication network, is to transmit or receive at a plurality of configured or preconfigured opportunities, like a plurality or semi-persistent scheduling, SPS, or configured grant, CG, opportunities; and wherein, responsive to one or more criteria, the UE is to skip one or more of the SPS or CG opportunities.

18 Claims, 6 Drawing Sheets

(58) Field of Classification Search
CPC ... H04W 72/569; H04W 72/11; H04W 76/28;
H04W 72/12; Y02D 30/70
See application file for complete search history.

(56) References Cited

U.S. PATENT DOCUMENTS

2019/0320491 A1 *  10/2019  Shukair ................ H04B 17/327
2021/0282164 A1     9/2021  Zhou et al.
2022/0416955 A1 *  12/2022  Xue ...................... H04W 72/23

OTHER PUBLICATIONS

3GPP TS 38.331 V16.0.0: "3GPP; TSG RAN; NR; Radio Resource
control (RRC) protocol specification (Rel. 16)", Mar. 2020.

* cited by examiner

100

SPS OR CG DEACTIVATION FOR REDCAP DEVICES

CROSS-REFERENCE TO RELATED APPLICATIONS

This application is a continuation of copending International Application No. PCT/EP2021/070564, filed Jul. 22, 2021, which is incorporated herein by reference in its entirety, and additionally claims priority from European Application No. 20188934.2, filed Jul. 31, 2020, which is also incorporated herein by reference in its entirety.

The present invention concerns the field of wireless communication networks or systems, more specifically, wireless communication networks in which a user device or UE is configured or preconfigured with semi-persistent scheduling, SPS, or configured grants CGs. Embodiments concern a deactivation of the SPS or CG for so-called reduced capability, RedCap, UEs.

BACKGROUND OF THE INVENTION

FIG. 1 is a schematic representation of an example of a terrestrial wireless network 100 including, as is shown in FIG. 1(a), the core network 102 and one or more radio access networks $RAN_1$, $RAN_2$, . . . $RAN_N$. FIG. 1(b) is a schematic representation of an example of a radio access network $RAN_n$ that may include one or more base stations $gNB_1$ to $gNB_5$, each serving a specific area surrounding the base station schematically represented by respective cells $106_1$ to $106_5$. The base stations are provided to serve users within a cell. The one or more base stations may serve users in licensed and/or unlicensed bands. The term base station, BS, refers to a gNB in 5G networks, an eNB in UMTS/LTE/LTE-A/ LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles, UAVs, the latter also referred to as drones, buildings and other items or devices having embedded therein electronics, software, sensors, actuators, or the like as well as network connectivity that enables these devices to collect and exchange data across an existing network infrastructure. FIG. 1(b) shows an exemplary view of five cells, however, the RAN, may include more or less such cells, and RAN, may also include only one base station. FIG. 1(b) shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1(b) shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1(b) by the arrows pointing to "core". The core network 102 may be connected to one or more external networks. The external network may be the Internet, or a private network, such as an Intranet or any other type of campus networks, e.g. a private WiFi or 4G or 5G mobile communication system. Further, some or all of the respective base station $gNB_1$ to $gNB_5$ may be connected, e.g. via the S1 or X2 interface or the XN interface in NR, with each other via respective backhaul links $116_1$ to $116_5$, which are schematically represented in FIG. 1(b) by the arrows pointing to "gNBs". A sidelink channel allows direct communication between UEs, also referred to as device-to-device, D2D, communication. The sidelink interface in 3GPP is named PC5.

For data transmission a physical resource grid may be used. The physical resource grid may comprise a set of resource elements to which various physical channels and physical signals are mapped. For example, the physical channels may include the physical downlink, uplink and sidelink shared channels, PDSCH, PUSCH, PSSCH, carrying user specific data, also referred to as downlink, uplink and sidelink payload data, the physical broadcast channel, PBCH, carrying for example a master information block, MIB, and one or more of a system information block, SIB, one or more sidelink information blocks, SLIBs, if supported, the physical downlink, uplink and sidelink control channels, PDCCH, PUCCH, PSSCH, carrying for example the downlink control information, DCI, the uplink control information, UCI, and the sidelink control information, SCI, and physical sidelink feedback channels, PSFCH, carrying PC5 feedback responses. Note, the sidelink interface may a support 2-stage SCI. This refers to a first control region containing some parts of the SCI, and optionally, a second control region, which contains a second part of control information.

For the uplink, the physical channels may further include the physical random-access channel, PRACH or RACH, used by UEs for accessing the network once a UE synchronized and obtained the MIB and SIB. The physical signals may comprise reference signals or symbols, RS, synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix, CP, length. A frame may also consist of a smaller number of OFDM symbols, e.g. when utilizing shortened transmission time intervals, sTTI, or a mini-slot/non-slot-based frame structure comprising just a few OFDM symbols.

The wireless communication system may be any single-tone or multicarrier system using frequency-division multiplexing, like the orthogonal frequency-division multiplexing, OFDM, system, the orthogonal frequency-division multiple access, OFDMA, system, or any other IFFT-based signal with or without CP, e.g. DFT-s-OFDM. Other waveforms, like non-orthogonal waveforms for multiple access, e.g. filter-bank multicarrier, FBMC, generalized frequency division multiplexing, GFDM, or universal filtered multi carrier, UFMC, may be used. The wireless communication system may operate, e.g., in accordance with the LTE-Advanced pro standard, or the 5G or NR, New Radio, standard, or the NR-U, New Radio Unlicensed, standard.

The wireless network or communication system depicted in FIG. 1 may be a heterogeneous network having distinct overlaid networks, e.g., a network of macro cells with each macro cell including a macro base station, like base station $gNB_1$ to $gNB_5$, and a network of small cell base stations, not shown in FIG. 1, like femto or pico base stations. In addition to the above described terrestrial wireless network also non-terrestrial wireless communication networks, NTN, exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication networks, for example in a network like that described above with reference to FIG. 1, like a LTE or 5G/NR network, there may be UEs that communicate directly with each other over one or more sidelink, SL, channels, e.g., using the PC5/PC3 interface or WiFi direct. UEs that communicate directly with each other over the sidelink may include vehicles communicating directly with other vehicles, V2V communication, vehicles communicating with other entities of the wireless communication network, V2X communication, for example roadside units, RSUs, roadside entities, like traffic lights, traffic signs, or pedestrians. RSUs may have functionalities of BS or of UEs, depending on the specific network configuration. Other UEs may not be vehicular related UEs and may comprise any of the above-mentioned devices. Such devices may also communicate directly with each other, D2D communication, using the SL channels.

In mobile communication networks, for example in a network like that described above with reference to FIG. 1, dynamic scheduling may be employed and a UE is provided with scheduling assignments or grants in every subframe. This provides the network with a high flexibility for assigning the resources to the UE, however, at the cost of the need to transmit resource allocation information, e.g., on the PDCCH, in every subframe. For certain services providing data at regular intervals, like VoIP or sensors transmitting measurement data regularly, the packet size may be small and the inter-arrival time of the packets is constant. In such scenarios the control signaling overhead for dynamically scheduling the resources is too high to support a large number of UEs. Semi-persistent scheduling, SPS, addresses this issue, and by configuring a UE with SPS, predefined SPS occasions or opportunities are defined at which the UE may expect receiving data. SPS may be configured for the downlink as well as for the uplink. In case of uplink transmissions, instead of configuring the UE with an uplink SPS, the UE may be configured with configured grants, GGs.

It is noted that the information in the above section is only for enhancing the understanding of the background of the invention and, therefore, it may contain information that does not form conventional technology that is already known to a person of ordinary skill in the art.

SUMMARY

An embodiment may have a user device, UE, for a wireless communication network, wherein the UE is to transmit or receive at a plurality of configured or preconfigured opportunities, like a plurality or semi-persistent scheduling, SPS, or configured grant, CG, opportunities; and wherein, responsive to one or more criteria, the UE is to skip one or more of the SPS or CG opportunities.

According to another embodiment, a wireless communication network may have one or more inventive user devices, UEs.

According to another embodiment, a method for operating a user device, UE, for a wireless communication network may have the steps of: transmitting or receiving at a plurality of configured or preconfigured opportunities, like a plurality or semi-persistent scheduling, SPS, or configured grant, CG, opportunities; and responsive to one or more criteria, skipping one or more of the SPS or CG opportunities.

According to another embodiment, a method for operating a wireless communication network may have the steps of: operating one or more user devices, UEs, according to the above method for operating a user device, UE, for a wireless communication network, the method having the steps of: transmitting or receiving at a plurality of configured or preconfigured opportunities, like a plurality or semi-persistent scheduling, SPS, or configured grant, CG, opportunities; and responsive to one or more criteria, skipping one or more of the SPS or CG opportunities.

Another embodiment may have non-transitory digital storage medium having a computer program stored thereon to perform any of the inventive methods when said computer program is run by a computer.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
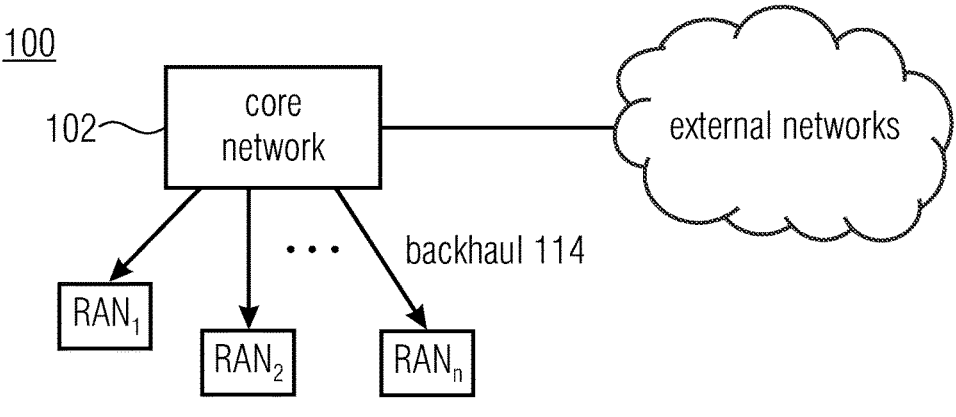
FIGS. 1(*a*) and 1(*b*) are schematic representations of an example of a terrestrial wireless network, wherein FIG. 1(*a*) illustrates a core network and one or more radio access networks, and FIG. 1(*b*) is a schematic representation of an example of a radio access network RAN.

Embodiments of the present invention are now described in more detail with reference to the accompanying drawings, in which the same or similar elements have the same reference signs assigned.

In a wireless communications network, like the one described above with reference to FIG. 1, several types or categories of user devices or UEs may be employed. For example, there are so-called full-powered UEs that are provided with a permanent power supply, like vehicular UEs obtaining power from a vehicles battery. For such UEs, energy consumption is not an issue. Other user devices or UEs, like hand-held UEs, do not have a permanent power supply but are battery driven so that energy consumption needs to be considered.

Also, there may be so-called Reduced Capability, Red-Cap, user devices or UEs having less capabilities when compared to other UEs, e.g., to enhanced Mobile Broad-Band, eMBB, UEs. The capabilities concerned may include a maximum bandwidth such a UE may support. For example, when operating in Frequency Range 1, FR1, the UE may support a maximum of 20 MHz bandwidth, and when operating in Frequency Range 2, FR2, the UE may support up to 100 MHz bandwidth. Further requirements of a RedCap UE may include one or more of the following:

Device complexity: reduced costs and complexity when compared to high-end eMBB and Ultra Reliable Low Latency Communication, URLLC, devices.

Device size: for most use cases device design with compact form factor is decried.

Deployment scenarios: support of all FR1/FR2 bands for Frequency Division Duplexing, FDD, and Time Division Duplexing, TDD.

RedCap UEs may comprise also industrial sensors or wearables using SL communication to communicate with other UEs directly or power-saving UEs which are technically capable of more complex procedures however want to save power. For example, wearables may use SL communication to communicate with cars or other wearables directly.

As mentioned above, in a wireless communication network a UE may be configured with SPS or CG so as to provide a mechanism allowing periodic messages without the need to provide a resource assignment each time, thereby reducing or saving control signaling. For example, the UE may be configured for SPS or CG type I or type II. Type I (type 1) may be activated and/or deactivated by a DCI. Type II (type 2) may be, for example exclusively, be radio resource control, RRC, configured and may, according to the example, be active as long as the configuration exists or is valid.

However, in case of the above-mentioned RedCap UEs, e.g., wearables, sensors and the like, there may be situations that respective occasions for a transmission or a reception, also referred to as SPS or CG occasions or opportunities, are not used. For example, the RedCap UE may not have any data to transmit on the resources provided by the SPS/CG, or data transmitted on these resources may not be meant for the RedCap UE. In such situations, for example in case SPS occasions in the data stream towards the RedCap UE are empty, for example, due to a lack of traffic or due to a preemption of an SPS-grant, the RedCap UE may unnecessarily try to decode a data packet and, since there is none, falsely transmit a non-acknowledgement message, NACK, to the transmitter or origin, which may be a base station of the network or, in case of a sidelink communication, another UE communicating with the RedCap UE over a sidelink or PC5 interface. Thus, in such situations, the RedCap UE wastes processing time and power and, thereby, its battery lifetime. Moreover, unnecessary traffic, like the unneeded NACK message, is generated on the radio link or air interface, and such traffic may also be the source for undesired interferences with other transmissions.

The present invention addresses the above problems by providing approaches avoiding unnecessary processing time at a RedCap device, thereby increasing its battery lifetime and avoiding unnecessary traffic. In accordance with embodiments of the present invention, responsive to certain situations or criteria, a user device, for example, a RedCap UE, like a wearable or a sensor, may skip certain SPS or CG occasions, thereby reducing the efforts at the UE side as far as possible, for example avoiding unnecessary decoding of data not meant for the UE and/or avoiding additional traffic on the air interface.

Figure 1B:
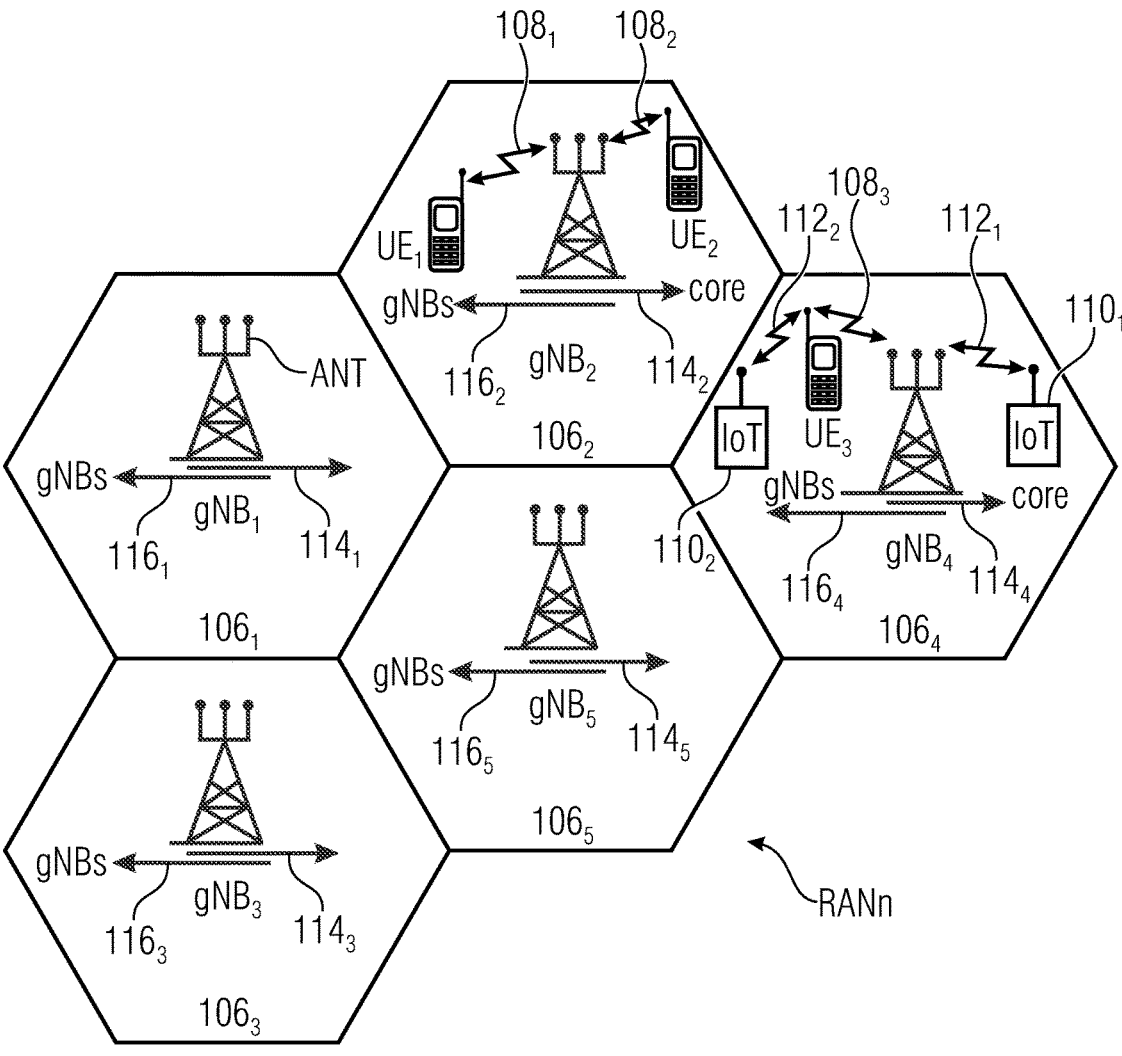
Figure 2:
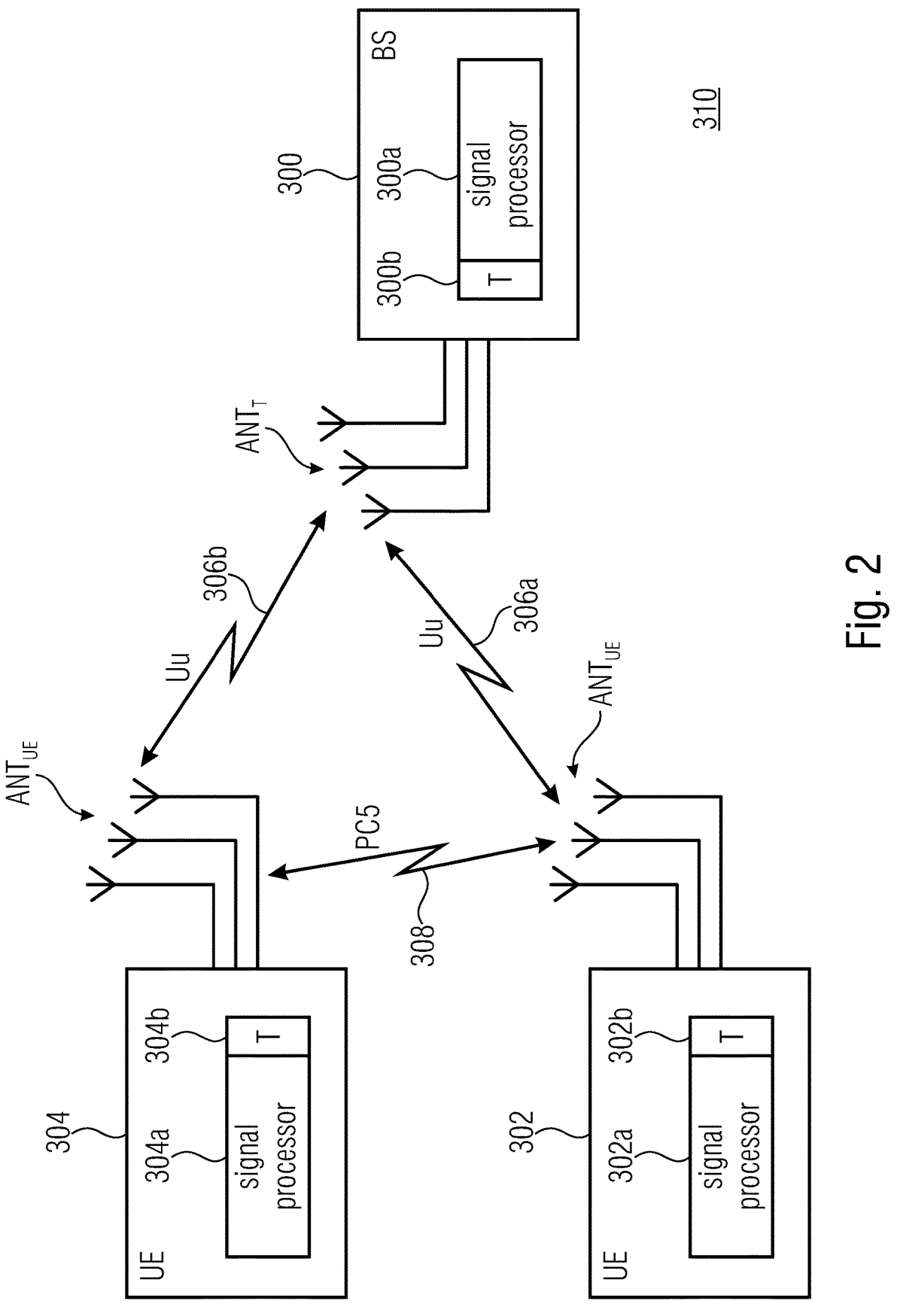
FIG. 2 is a schematic representation of a wireless communication system including a transmitter, like a base station, one or more receivers, like user devices, UEs, and one or more relay UEs for implementing embodiments of the present invention.

Embodiments of the present invention may be implemented in a wireless communication system as depicted in FIG. 1 including base stations and users, like mobile terminals or IoT devices. FIG. 2 is a schematic representation of a wireless communication system including a transmitter 300, like a base station, and one or more receivers 302, 304, like user devices, UEs. The transmitter 300 and the receivers 302, 304 may communicate via one or more wireless communication links or channels 306a, 306b, 308, like a radio link. The transmitter 300 may include one or more antennas $ANT_T$ or an antenna array having a plurality of antenna elements, a signal processor 300a and a transceiver 300b, coupled with each other. The receivers 302, 304 include one or more antennas $ANT_{UE}$ or an antenna array having a plurality of antennas, a signal processor 302a, 304a, and a transceiver 302b, 304b coupled with each other. The base station 300 and the UEs 302, 304 may communicate via respective first wireless communication links 306a and 306b, like a radio link using the Uu interface, while the UEs 302, 304 may communicate with each other via a second wireless communication link 308, like a radio link using the PC5/sidelink, SL, interface. When the UEs are not served by the base station or are not connected to a base station, for example, they are not in an RRC connected state, or, more generally, when no SL resource allocation configuration or assistance is provided by a base station, the UEs may communicate with each other over the sidelink, SL. The system or network of FIG. 2, the one or more UEs 302, 304 of FIG. 2, and the base station 300 of FIG. 2 may operate in accordance with the inventive teachings described herein.

Embodiments of the present invention provide for a user device, UE, for a wireless communication network, wherein the UE is to transmit or receive at a plurality of configured or preconfigured opportunities, like a plurality or semi-persistent scheduling, SPS, or configured grant, CG, opportunities; and wherein, responsive to one or more criteria, the UE is to skip one or more of the SPS or CG opportunities.

Embodiments of the present invention provide for a user device, UE, wherein the one or more criteria comprise one or more of the following:

lack of traffic towards or from the UE, receipt of a control message, receipt of a parameter, not receiving a wake-up signal, WUS, in a time window prior to a SPS or CG opportunity Embodiments of the present invention provide for a user device, UE, wherein the UE is to receive a parameter indicating to skip the next k SPS or CG opportunities, with k=1, 2, 3 . . . n, or to skip every k-th SPS or CG opportunity, or pause-resume a SPS or CG, or a pattern, like a vector or a bitfield or an index, indicating which of the next SPS or CG opportunities are to be skipped.

Embodiments of the present invention provide for a user device, UE, wherein the UE is to receive a control message, e.g., a DCI, the control message including the parameter or the pattern, or configured semi-statically with the parameter or the pattern, or preconfigured with the parameter or the pattern.

Embodiments of the present invention provide for a user device, UE, wherein the UE is configured or preconfigured with a validity timer, the validity timer defining a certain number of times or a certain length, and wherein the UE is to skip one or more SPS or CG opportunities only during the validity timer.

Embodiments of the present invention provide for a user device, UE, wherein the UE is configured or preconfigured with a wake-up-signal, WUS, configuration, and the UE is to monitor a channel for a WUS before a SPS or CG opportunity, and responsive to the absence of the WUS, the UE is to skip a configured or preconfigured number of SPS or CG opportunities, or responsive to the presence of the WUS, the UE is to wake up and receive or transmit during the SPS or CG opportunities, or look for a SPS or CG skipping message, and responsive to receiving the skipping message, the UE is to go back to sleep, and responsive to not receiving the skipping message, the UE is to receive or transmit during the SPS or CG opportunities.

Embodiments of the present invention provide for a user device, UE, wherein the UE is to receive a control message indicting that one or more SPS or CG opportunities are to be skipped, the control message being received ahead of the one or more SPS or CG opportunities to be skipped, or at the time of receiving or following the one or more SPS or CG opportunities to be skipped.

Embodiments of the present invention provide for a user device, UE, wherein, in case the control message is received ahead of the one or more SPS or CG opportunities to be skipped, the UE is to receive from a transmitter, like a gNB or another UE, the control message, e.g. a DCI, to skip a number of SPS/CG opportunities which come after the control message or in a certain window or after a time gap after the control message, wherein the control message may explicitly indicate the number of skipped SPS or CG opportunities.

Embodiments of the present invention provide for a user device, UE, wherein, in case the control message is received at the time of receiving or following the one or more SPS or CG opportunities to be skipped, the UE is to receive from a transmitter, like a gNB or another UE, the control message indicating that the data is not meant for the UE, to free a HARQ buffer, and/or not to perform a decoding attempt, if not done already.

Embodiments of the present invention provide for a user device, UE, wherein the control message is piggybacked with data at the SPS or CG opportunity.

Embodiments of the present invention provide for a user device, UE, wherein the UE is not to report a HARQ feedback for the data on a received SPS with data which was not meant for the UE.

Embodiments of the present invention provide for a user device, UE, wherein the UE is not to expect a HARQ feedback for the transmitted data on a skipped CG.

Embodiments of the present invention provide for a user device, UE, wherein the UE is to report an ACK to indicate a correct reception of the control message.

Embodiments of the present invention provide for a user device, UE, wherein the UE is to receive a control message indicting one or more of the SPS or CG opportunities following the receipt of the control message to be used, and not to use an SPS or CG opportunity indicated by the control message.

Embodiments of the present invention provide for a user device, UE, wherein the control message explicitly indicates the SPS or CG opportunities to be used, and/or indicate a certain number of consecutive SPS or CG opportunities to be used.

Embodiments of the present invention provide for a user device, UE, wherein the UE is to receive a control message signaling a temporary deactivation of the SPS or CG opportunities following the receipt of the control message, and responsive to the control message, pause the SPS or CG operation.

Embodiments of the present invention provide for a user device, UE, wherein the temporary deactivation is valid for a certain time period or until receipt of a control message signaling a reactivation of the SPS or CG opportunities, and responsive to the end of the time period or to the signaling of the reactivation, the UE is to resume the SPS or CG operation.

Embodiments of the present invention provide for a user device, UE, wherein the UE is not to increase an HARQ process ID for each skipped SPS or CG opportunity.

Embodiments of the present invention provide for a user device, UE, wherein the UE is to skip a predefined number SPS or CG opportunities following a successfully decoding of one or more SPS or CG opportunities.

Embodiments of the present invention provide for a user device, UE, wherein the UE is to skip SPS opportunities during the present SPS period or until a further control message, like a DCI, is received.

Embodiments of the present invention provide for a user device, UE, wherein the UE is capable to operate in a first frequency range or supports a first maximum bandwidth, the first frequency range or first maximum bandwidth being less than a second frequency range or a second maximum bandwidth of one or more further UEs in the wireless communication network.

Embodiments of the present invention provide for a user device, UE, wherein the user device comprises one or more of the following: a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and needing input from a gateway node at periodic intervals, or a mobile terminal, or a stationary terminal, or a cellular IoT-UE, or a vehicular UE, or a vehicular group leader (GL) UE, or an IoT or narrowband IoT, NB-IoT, device, a wearable, a reduced capability (RedCap) device, or a ground based vehicle, or an aerial vehicle, or a drone, or a moving base station, or road side unit (RSU), or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

Embodiments of the present invention provide for a wireless communication network, comprising one or more user devices, UEs, described herein.

Embodiments of the present invention provide for a wireless communication network, wherein the wireless communication network further comprises one or more further UEs or an entity of the core network or the access network of the wireless communication network.

Embodiments of the present invention provide for a wireless communication network, wherein the further UE or the entity of the core network or the access network is to perform a PUSCH or PSSCH detection for CGs or a HARQ detection for SPS to determine that the UE missed a corresponding skip message, and responsive to detecting that the UE missed a corresponding skip message, adapt a HARQ process ID accordingly.

Embodiments of the present invention provide for a wireless communication network, wherein the entity of the core network or the access network comprises one or more of the following: a macro cell base station, or a small cell base station, or a central unit of a base station, or a distributed unit of a base station, or a road side unit, RSU, or an AMF, or an MME, or an SMF, or a core network entity, or mobile edge computing, MEC entity, or a network slice as in the NR or 5G core context, or any transmission/reception point, TRP, enabling an item or a device to communicate using the wireless communication network, the item or device being provided with network connectivity to communicate using the wireless communication network.

Embodiments of the present invention provide for a method for operating a user device, U E, for a wireless communication network, the method comprising:

transmitting or receiving at a plurality of configured or preconfigured opportunities, like a plurality or semi-persistent scheduling, SPS, or configured grant, CG, opportunities; and responsive to one or more criteria, skipping one or more of the SPS or CG opportunities.

Embodiments of the present invention provide for a method for operating a wireless communication network, comprising operating one or more user devices, UEs, according to a method for operating a user device, i.e., transmitting or receiving at a plurality of configured or preconfigured opportunities, like a plurality or semi-persistent scheduling, SPS, or configured grant, CG, opportunities; and responsive to one or more criteria, skipping one or more of the SPS or CG opportunities.

Embodiments of the present invention provide for a non-transitory computer program product comprising a computer readable medium storing instructions which, when executed on a computer, perform a method according to an embodiment.

Embodiments of the present invention provide a computer program product comprising instructions which, when the program is executed by a computer, cause the computer to carry out one or more methods in accordance with the present invention.

Figure 3:
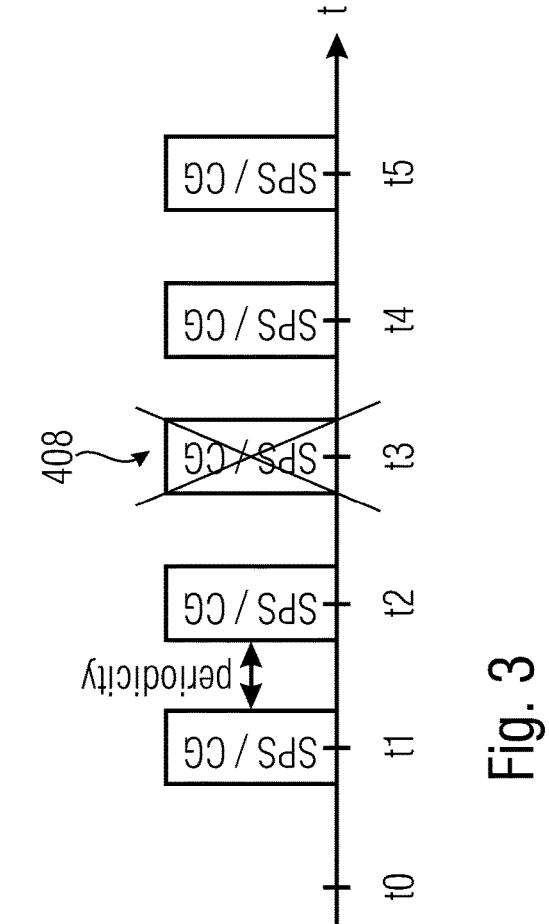
FIG. 3 illustrates an embodiment of a user device or UE 400 in accordance with embodiments of the present invention.
Figure 3:
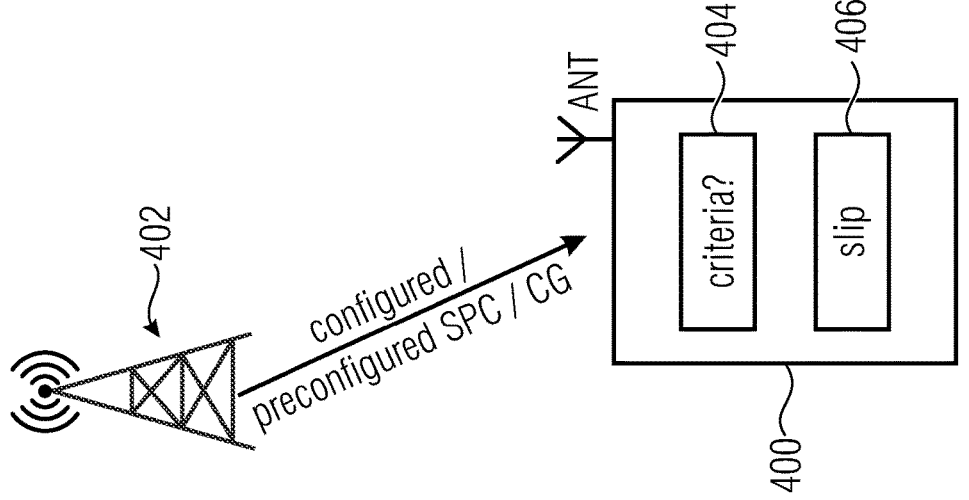

FIG. 3 illustrates an embodiment of a user device or UE 400 in accordance with embodiments of the present invention. UE 400 is configured or preconfigured with a plurality of transmit/receive opportunities, for example a base station 402 of the wireless communication network may configure or preconfigure UE 400 with semi-persistent scheduling, SPS, or configured grant, CG, opportunities. In FIG. 3, it is assumed that UE 400, at times t1 to t4 is configured with SPS or downlink opportunities or with CG or uplink opportunities occurring in time with a predefined periodicity. In accordance with the inventive approach, UE 400, as is indicated at 404 determines whether one or more criteria are fulfilled, and in case at least one of the criteria is fulfilled, as is indicated at 406, UE 400 decides to skip one or more of the SPS or CG opportunities. In the embodiment depicted in FIG. 3, it is assumed that UE determines that it has no data to be transmitted at time t3, i.e., there is a lack of traffic from the UE, and therefore, when this is determined at 404, UE 400, at 406 skips the CG opportunity at t3, as is indicated by the crossed-out SPS/CG opportunity 408 in FIG. 3.

In accordance with other embodiments, the UE 400 may decide to skip one or more of the SPS/CG opportunities in case of a lack of traffic towards the UE, i.e., in case no data is transmitted on one or more of the opportunities t1 to t4, or in case data transmitted is not meant for the UE. In accordance with yet other embodiments, UE 400 may decide to skip certain SPS/CG opportunities responsive to receiving a control message or a parameter indicating that one or more of the SPS/CG opportunities are to be skipped.

Control Signaling for SPS/CG Skipping

In accordance with embodiments, a control message, e.g. downlink control information, DCI, may be provided to indicate a parameter or a pattern identifying SPS/CG opportunities, also referred to as downlink/uplink opportunities that are to be skipped. In accordance with embodiments, the UE 400 of FIG. 3 may receive a parameter, for example using a control message, that indicates that the next k SPS or CG opportunities are to be skipped. For example, k=1, 2, 3 . . . n, with n being an integer, so that in case k=1 only the next SPS or CG opportunity is signaled to be skipped. In accordance with embodiments, the parameter may indicate that every k-th SPS or CG opportunity is to be skipped. In accordance with other embodiments, a pattern may be received, like a vector or a bitfield pattern, that indicates which of the future or upcoming SPS occasions are to be skipped. A pattern of [1, 0, 0, 1] received, for example at time t0 in FIG. 3, indicates that the SPS/CG opportunities at t2 and at t3 are to be skipped, i.e., the second and third upcoming SPS/CG opportunity, following receipt of the parameter at t0, are to be skipped.

When indicating that every k-th SPS/CG opportunity or occasion is to be skipped, this results in an increase of the periodicity, for example, in case the periodicity is configured to be 100 ms and in case k indicates that every second SPS/CG occasion is to be skipped, i.e., k=2, this configures the UE 400 to only receive/transmit at occasions every 200 ms.

In accordance with further embodiments, rather using a control message to indicate the parameter k or the pattern, the UE may also be configured semi-statically with the parameter or the pattern or may be preconfigured with the parameter or the pattern.

In accordance with further embodiments of the present invention, the UE 400 may apply the skipping operation only during a certain time, like a validity timer that defines a predefined number of times or a predefined duration. Thus, skipping may only occur during n-times or for a length of n ms.

Wake-Up-Signal, WUS, for SPS/CG Skipping

Figure 4:
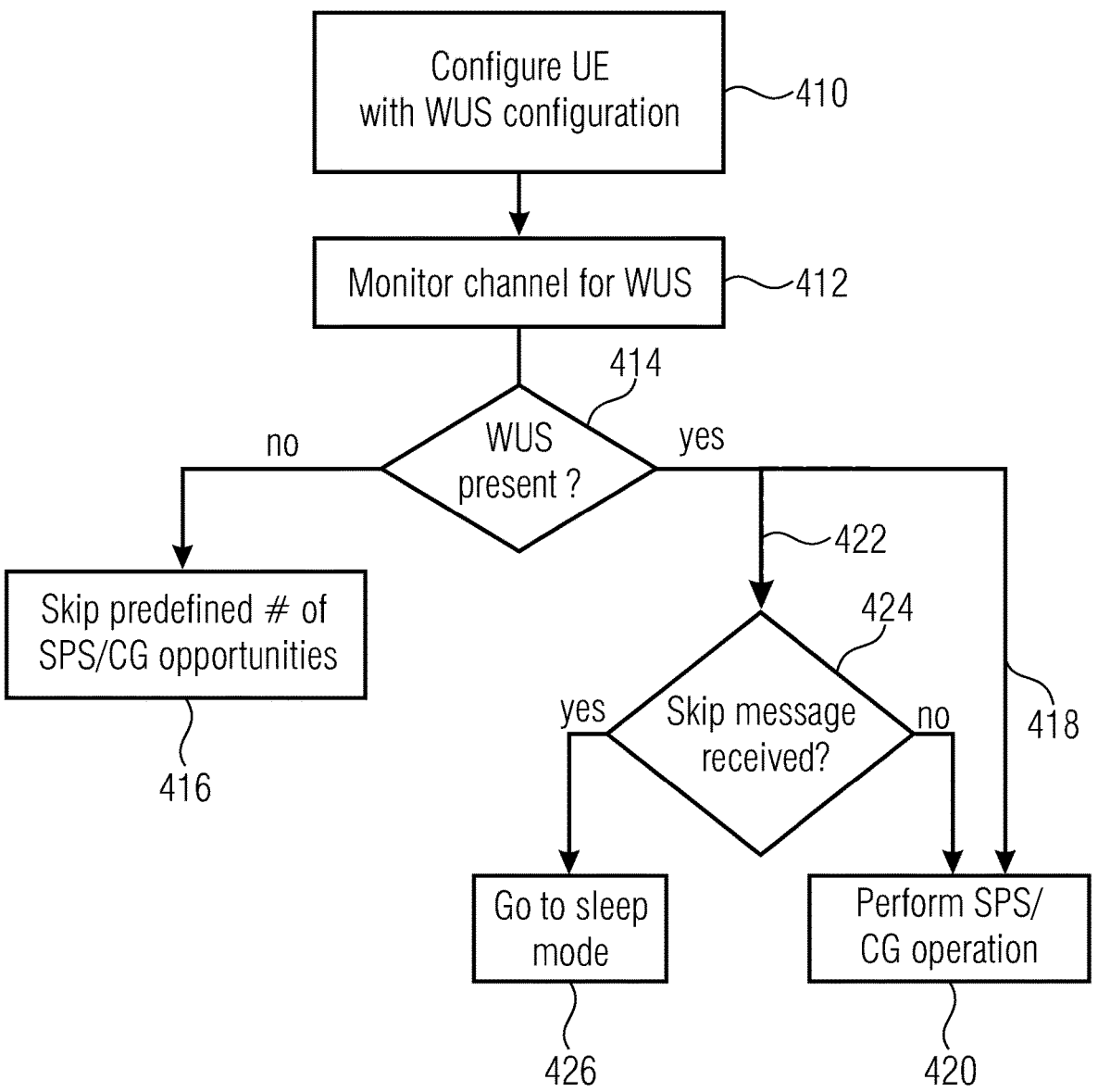
FIG. 4 is a flow diagram illustrating an embodiment employing a WUS for performing SPS/CG skipping in accordance with an embodiment of the present invention.

In accordance with yet further embodiments, a wake-up-signal, WUS, may be employed, like the WUS introduced in Rel. 16 to avoid unnecessary ON times during a discontinuous reception, DRX, procedure. Embodiments of the present invention make use of the WUS to indicate whether a number of configured or preconfigured SPS/CG opportunities are to be skipped. The UE 400 of FIG. 3 may be configured with a certain WUS configuration, like an existing WUS configuration or a newly defined WUS configuration, as is indicated in FIG. 4 at 410. FIG. 4 is a flow diagram illustrating an embodiment employing the WUS for performing SPS/CG skipping in accordance with an embodiment of the present invention. Following the configuration of the UE 400 with the WUS configuration at 410, the UE, as is indicated at 412, monitors a channel for the WUS before the time a SPS/CG opportunity occurs. UE 400 determines, as is indicated at 414, whether or not a WUS is present in the channel. In case the WUS is not present, the UE skips a predefined number of SPS/CG opportunities, as indicated at 416. In case the presence of the WUS is determined, in accordance with embodiments, the UE, as indicated at 418, may use the SPS/CG opportunities with which it is configured/preconfigured for receiving/transmitting data, as is indicated at 420.

An example of an additional field in the existing ConfiguredGrantConfig IE may be used to indicate whether a number of configured or preconfigured SPS/CG opportunities are to be skipped, e.g., as indicated at 416, possibly dependent on the use of WUS.

An example pseudo-code for this field may read like

```
ConfiguredGrantConfig ::=   SEQUENCE {
. . .
   skippedGrantOccassions INTEGER(1... maxNoSkippedOcc)
OPTIONAL, -- Cond DormancyWUS
. . .}
```

A similar field may be introduced in the SPS-Config IE, e.g., using a code being based on a pseudo-code like

```
:
SPS-Config ::=      SEQUENCE {
   skippedSchedulingOccassions INTEGER(1... maxNoSkippedOcc)
OPTIONAL, - - Cond DormancyWUS
. . .}
```

"Cond DormancyWUS" may be understood as a conditional presence of a field named, within the example given, DormancyWUS. Such a field may be optionally present, e.g., if WUS is configured; otherwise it may be absent.

Another way of configuring the skipped occasions is to use the list for different configurations that would have different number of skipped occasions.

```
SkipConfigsList::=SEQUENCE (SIZE (1 . . .
   NrofSkipConfigs)) OF INTEGER (1 . . .
   maxNoSkippedOcc)
```

In accordance with other embodiments, as indicated at 422, when determining at 414 that the WUS is present, the UE may employ a two stage process in accordance with which, initially, the UE determines whether a skipping message is received or not, as is indicated at 424 in FIG. 4. In other words, the presence of the WUS wakes up the UE 400 which then looks for the SPS/CG skipping message and, in case such a message is received, UE 400 goes back to the sleep mode as is indicated at 426. Otherwise, in case the skipping message is not received, UE 400, as is indicated at 420 receives/transmits at the respective SPS/CG opportunities.

Pre-SPS/CG or Post-SPS Skip Message

Figures 5, 6:
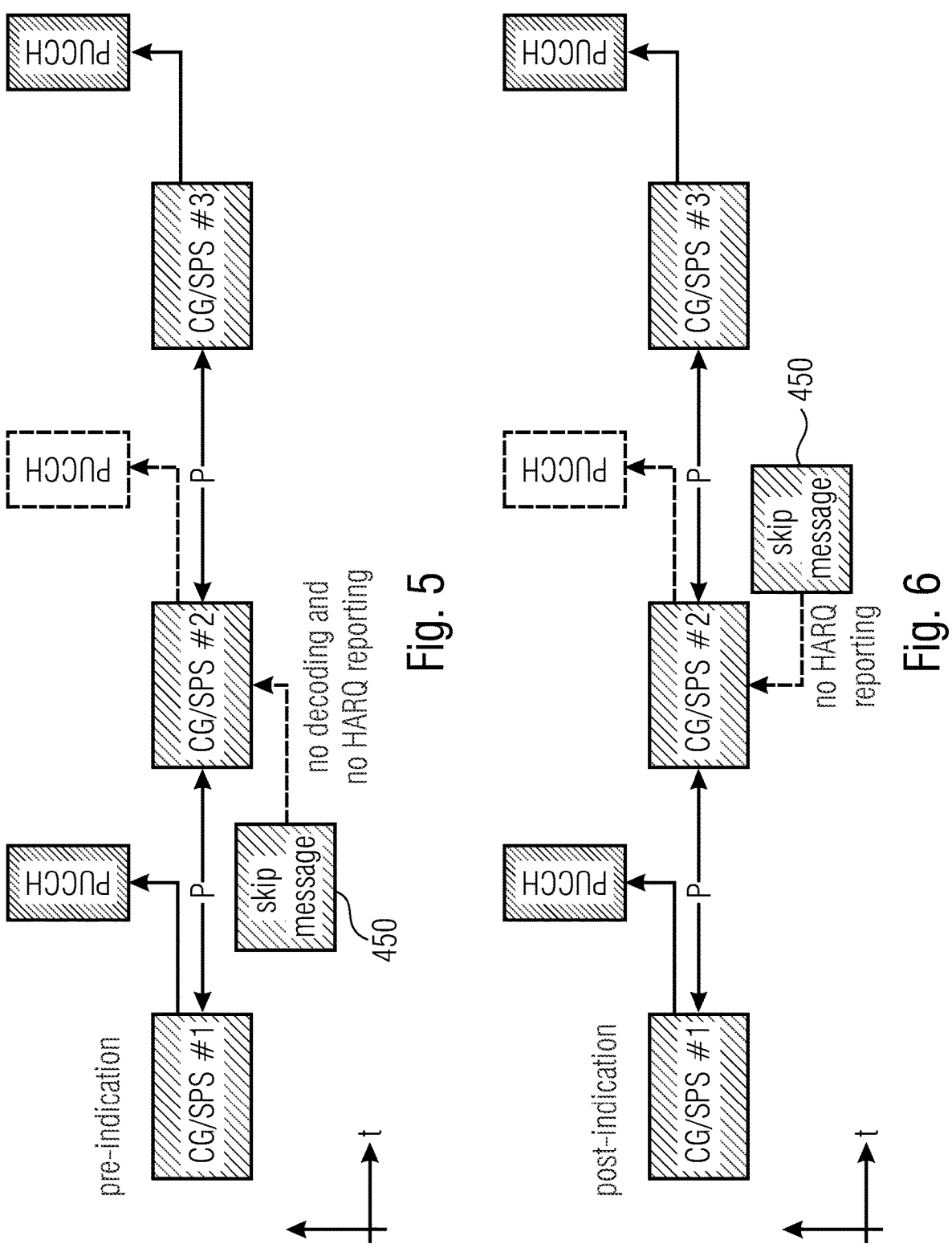
FIG. 5 illustrates a pre-indication of the skipping of one or more SPS/CG opportunities in accordance with embodiments of the present invention.
FIG. 6 illustrates a post-indication for skipping SPS/CG opportunities in accordance with embodiments of the present invention.

In accordance with further embodiments, UE 400 may receive a control message indicating that one or more of the SPS or CG opportunities are to be skipped either ahead of the one or more SPS or CG opportunities to be skipped, also referred to as a pre-SPS/CG skip message, or at the time of reception or at a time following reception of one or more SPS or CG opportunities, also referred to as a post-SPS/CG skip message. FIG. 5 illustrates a pre-indication of the skipping of one or more SPS/CG opportunities in accordance with embodiments of the present invention. FIG. 5 illustrates three SPS/CG opportunities #1, #2 and #3 occurring in time with periodicity P. The first occurrence or opportunity #1 is assumed to be employed so that, for example when considering an uplink transmission, the UE 400 will transmit data at the opportunity #1, as is illustrated by the PUCCH in FIG. 5. Ahead of the next CG/SPS opportunity #2, UE 400 receives the skip message 450 which causes the UE not to perform any steps with regard to an uplink transmission, e.g. preparing data for an uplink transmission including selecting a packet, encoding, modulating, etc. In case of an SPS, the UE 400, responsive to the skip message recognizes that data at opportunity #2 are not meant for UE 400, and UE 400 will neither decode the data at opportunity #2 nor will it provide a HARQ reporting. In the embodiment of FIG. 5, the next opportunity #3 is used by the UE 400 again. In accordance with embodiments, the resources for opportunity #2 may be reused by other UEs in the system. Thus, in accordance with this embodiment, a gNB or another UE communicating with UE 400 over a sidelink, may send the control message, like a DCI or SCI, also referred to as the skip message 450 causing the deactivation of one or more of the SPS/CG opportunities with which the UE 400 is configured and which come after the control message is received. In accordance with other embodiments, the control message may also indicate a certain time window within which the SPS/CG opportunities are skipped, or a time gap following receipt of the control message may be indicated after which the one or more SPS/CG opportunities are to be skipped. In accordance with further embodiments, the control message may explicitly indicate the number of deactivated SPS/CG opportunities.

FIG. 6 illustrates a post-indication for skipping SPS/CG opportunities in accordance with embodiments of the present invention. Again, it is assumed, as in FIG. 5, that opportunity #2 is not associated with a transmission or reception of data associated with UE 400. In the embodiment depicted in FIG. 6, an SPS transmission is assumed to occur at opportunity #2 that is not meant for UE 400. In such a case, the gNB or another UE may send the skip message 450 after or at the time of the SPS message. In accordance with embodiments, the control message may be piggybacked with the data within the SPS opportunity or occasion. The control message indicates to the UE 400 that the SPS message or data is not meant for the UE 400 and that the HARQ buffer of the UE may be flushed or freed and that no decoding attempt has to be performed by the UE. In accordance with further embodiments, receiving the message 450 may cause the UE to not report any HARQ feedback, thereby avoiding unnecessary feedback traffic and potential interferences associated with this kind of traffic.

In accordance with yet further embodiments, responsive to receiving the skip message 450 in FIGS. 5 and 6, UE 400 message, and responsive to such a detected miss adapts the HARQ process ID accordingly.

Skipping after Decoding Success

In accordance with yet further embodiments of the present invention, UE 400 may be configured to skip the next k (k=1,2,3 . . . ) occasions or occurrences after successfully decoding at one or more SPS occasions. This may be used to avoid decoding data which is sent repeatedly so as to allow the UE 400 to go into a power-saving mode until a new SPS cycle begins. In accordance with embodiments, this may be aligned with the SPS periodicity or until a new control message is received by UE 400.

One or more different periodicity configurations may be indicated or configured by use of a signaling which may incorporate, for example, a new subfield which may be referred to as SPS-PeriodicityConfig. Such a signaling may provide different periodicity configurations with a number of skipped occasions for any of the configured periodicities.

An example pseudo-code for such a field may comprise:

```
SPS-Config ::=          SEQUENCE {
. . .
SPS-PeriodicityConfig ::=          SEQUENCE {
periodicity          ENUMERATED {ms10, ms20, ms32, ms40, ms64, ms80, ms128,
ms160, ms320, ms640,
                         spare6, spare5, spare4, spare3, spare2, spare1},
skippedSchedulingOccassions       INTEGER(1... maxNoSkippedOcc) OPTIONAL,
. . .}
. . .}
``` may send an acknowledgement message or ACK, indicating the successful receipt of the deactivation or skip message 450.

Converse Signaling

In accordance with embodiments, instead of a skip message, the gNB may operate the SPS/CG in a "use on demand" mode. The UE 400 is configured with all related parameters for the SPS and CG but only uses SPS or CG occasions which are explicitly signaled to be free by the gNB. The UE, instead of receiving a skip signaling, may receive from a gNB or another UE "use next k occasions" signal, with k=1, 2, 3, . . . n, with n being an integer. For example, the UE may receive from the gNB an indication to "use next k occasions". In another example, the UE may receive an indication to use the k-th occasions out of n occasions, with n being a configured or preconfigured integer.

HARQ Process ID Counting

In accordance with conventional approaches, the HARQ process ID determination procedure does not consider the possibility that a SPS/CG opportunity may be skipped. Therefore, conventionally, the HARQ process ID is increased for each SPS/CG opportunity. In accordance with embodiments of the present invention, to correctly reflect the HARQ process IDs, when skipping or deactivating one or more CG/SPS opportunities, these opportunities are not counted for determining the HARQ process ID.

In accordance with other embodiments of the present invention, to detect a misalignment in the HARQ process ID due to a missed skip message, a gNB or UE may use PUSCH or PSSCH detection for CGs or a HARQ detection for SPS to determine that UE 400 missed the corresponding skip

Pause-Resume Mode

In accordance with further embodiments of the present invention, the signaling described herein may also be used for a pause-resume mode operation of the SPS or CGs. In accordance with embodiments, the UE 400 may receive a temporary deactivation signal and stop the SPS or CG operation. The temporary deactivation signal may be valid for a certain time period or until reception of a reactivation signal or resume message. Responsive to the end of the time period or responsive to the reactivation signal, UE 400 resumes the SPS or CG operation. This embodiment is advantageous as, contrary to conventional activation/deactivation approaches, no new resource allocation is to be done because all associated parameters are preserved and continued to be used when resuming operation.

General

Although the respective aspects and embodiments of the inventive approach have been described separately, it is noted that each of the aspects/embodiments may be implemented independent from the other, or some or all of the aspects/embodiments may be combined. Moreover, the subsequently described embodiments may be used for each of the aspects/embodiments described so far.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments of the present invention, a user device comprises one or more of the following: a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and needing input from a gateway node at periodic intervals, a mobile terminal, or a stationary terminal, or a cellular IoT-UE, or a vehicular UE, or a vehicular group leader (GL) UE, or a sidelink relay, or an IoT or narrowband IoT, NB-IoT, device, or wearable device, like a smartwatch, or a fitness tracker, or smart glasses, or a ground based vehicle, or an aerial vehicle, or a drone, or a moving base station, or road side unit (RSU), or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

In accordance with embodiments of the present invention, a network entity comprises one or more of the following: a macro cell base station, or a small cell base station, or a central unit of a base station, or a distributed unit of a base station, or a road side unit (RSU), or a remote radio head, or an AMF, or an MME, or an SMF, or a core network entity, or mobile edge computing (MEC) entity, or a network slice as in the NR or 5G core context, or any transmission/reception point, TRP, enabling an item or a device to communicate using the wireless communication network, the item or device being provided with network connectivity to communicate using the wireless communication network.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 7:
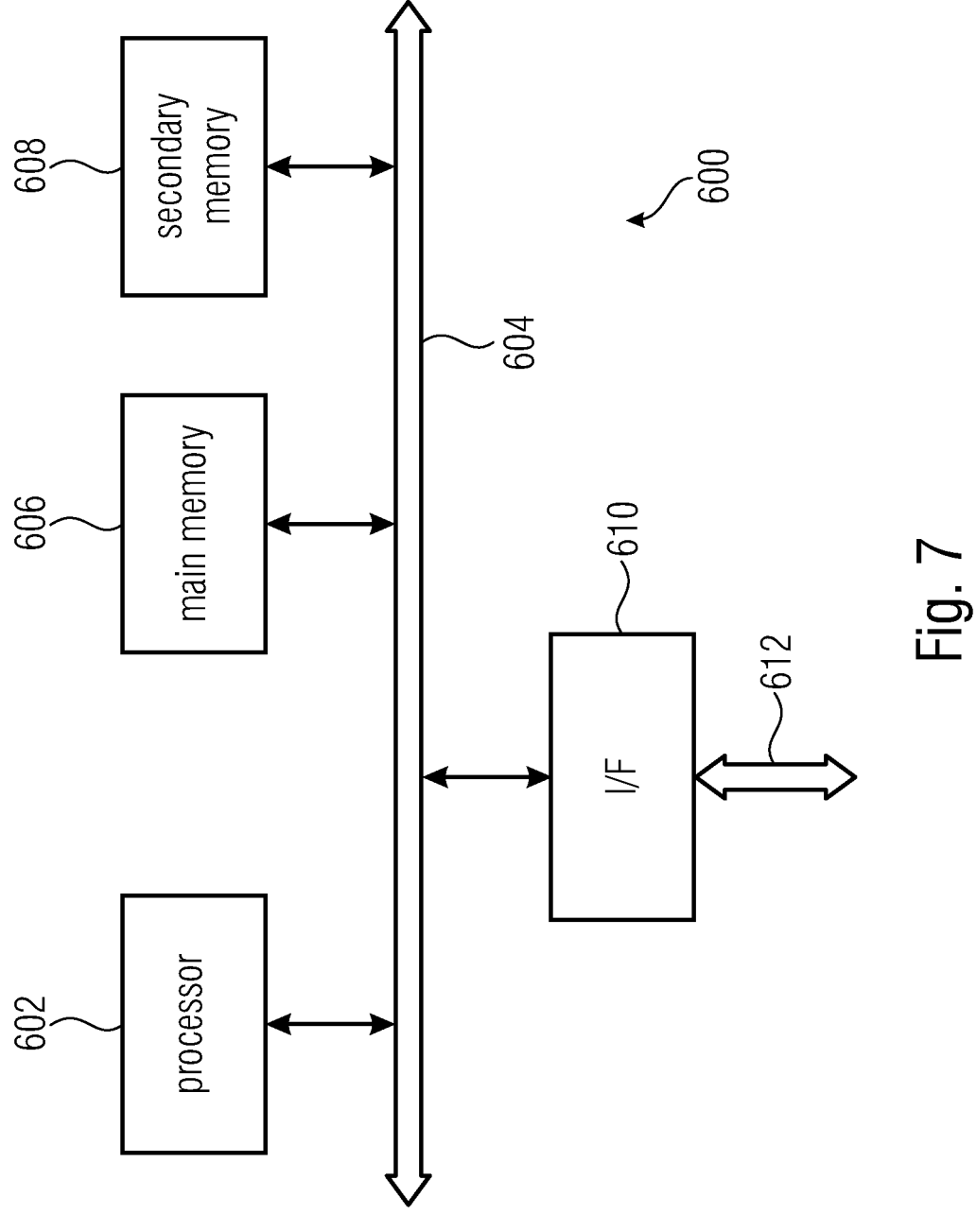
FIG. 7 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 7 illustrates an example of a computer system 600. The units or modules as well as the steps of the methods performed by these units may execute on one or more computer systems 600. The computer system 600 includes one or more processors 602, like a special purpose or a general-purpose digital signal processor. The processor 602 is connected to a communication infrastructure 604, like a bus or a network. The computer system 600 includes a main memory 606, e.g., a random-access memory, RAM, and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the from electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate or are capable of cooperating with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier or a digital storage medium, or a computer-readable medium comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device, for example a field programmable gate array, may be used to perform some or all of the functionalities of the methods described herein. In some embodiments, a field program-mable gate array may cooperate with a microprocessor in order to perform one of the methods described herein. Generally, the methods are performed by any hardware apparatus.

While this invention has been described in terms of several advantageous embodiments, there are alterations, permutations, and equivalents, which fall within the scope of this invention. It should also be noted that there are many alternative ways of implementing the methods and compo-sitions of the present invention. It is therefore intended that the following appended claims be interpreted as including all such alterations, permutations, and equivalents as fall within the true spirit and scope of the present invention.

The invention claimed is:

1. A user device (UE) for a wireless communication network,
   wherein the UE is to transmit or receive at a plurality of configured or preconfigured opportunities, like a plu-rality or semi-persistent scheduling (SPS) or configured grant (CG) opportunities;
   wherein, responsive to one or more criteria, the UE is to skip one or more of the SPS or CG opportunities, and
   wherein the one or more criteria comprise a lack of traffic from or towards the UE.

2. The user device (UE) of claim 1, wherein the one or more criteria comprise one or more of the following:
   receipt of a control message,
   receipt of a parameter,
   not receiving a wake-up signal (WUS) in a time window prior to an SPS or CG opportunity.

3. The user device (UE) of claim 1, wherein the UE is to receive a parameter indicating
   to skip a next k SPS or CG opportunities, with k=1, 2, 3 . . . n, or
   to skip every k-th SPS or CG opportunity, or
   pause-resume an SPS or CG, or
   a pattern, like a vector or a bit-field or an index, indicating which of the next SPS or CG opportunities are to be skipped.

4. The user device (UE) of claim 3, wherein the UE is
   to receive a control message, e.g., a DCI, the control message comprising the parameter or the pattern, or
   configured semi-statically with the parameter or the pat-tern, or
   preconfigured with the parameter or the pattern.

5. The user device (UE) of claim 1, wherein the UE is configured or preconfigured with a validity timer, the valid-ity timer defining a certain number of times or a certain length, and wherein the UE is to skip one or more SPS or CG opportunities only during the validity timer.

6. The user device (UE) of claim 1, wherein
   the UE is configured or preconfigured with a wake-up-signal, WUS, configuration, and
   the UE is to monitor a channel for a WUS before an SPS or CG opportunity, and
      responsive to an absence of the WUS, the UE is to skip a configured or preconfigured number of SPS or CG opportunities, or
      responsive to a presence of the WUS, the UE is to wake up and
         receive or transmit during the SPS or CG opportu-nities, or
         look for an SPS or CG skipping message, and
            responsive to receiving the skipping message, the UE is to go back to sleep, and responsive to not receiving the skipping message, the UE is to receive or transmit during the SPS or CG opportunities.

7. The user device (UE) of claim 1, wherein the UE is to receive a control message indicting that one or more SPS or CG opportunities are to be skipped, the control message being received
   ahead of the one or more SPS or CG opportunities to be skipped, or
   at a time of receiving or following the one or more SPS or CG opportunities to be skipped.

8. The user device (UE) of claim 7, wherein, in case the control message is received ahead of the one or more SPS or CG opportunities to be skipped, the UE is to receive from a transmitter, like a gNB or another UE, the control message, e.g. a DCI, to skip a number of SPS or CG opportunities which come after the control message or in a certain window or after a time gap after the control message, wherein the control message explicitly indicates a number of skipped SPS or CG opportunities.

9. The user device (UE) of claim 7, wherein, in case the control message is received at the time of receiving or following the one or more SPS or CG opportunities to be skipped, the UE is
   to receive from a transmitter, like a gNB or another UE, the control message indicating that a data is not meant for the UE,
   to free a HARQ buffer, and/or
   not to perform a decoding attempt, if not done already.

10. The user device (UE) of claim 9, wherein the control message is piggybacked with data at an SPS or CG oppor-tunity.

11. The user device (UE) of claim 9, wherein the UE is not to report a HARQ feedback for data on a received SPS with the data which was not meant for the UE.

12. The user device (UE) of claim 9, wherein the UE is not to expect a HARQ feedback for transmitted data on a skipped CG.

13. The user device (UE) of claim 9, wherein the UE is to report an ACK to indicate a correct reception of the control message.

14. The user device (UE) of claim 1, wherein the UE is to
   receive a control message signaling a temporary deacti-vation of the SPS or CG opportunities following a receipt of the control message, and
   responsive to the control message, pause an SPS or CG operation.

15. The user device (UE) of claim 14, wherein
   the temporary deactivation is valid for a certain time period or until receipt of a control message signaling a reactivation of the SPS or CG opportunities, and
   responsive to an end of the time period or to the signaling of the reactivation, the UE is to resume the SPS or CG operation.

16. The user device (UE) of claim 1, wherein the user device comprises one or more of the following: a power-limited UE, or a hand-held UE, like a UE used by a pedestrian, and referred to as a Vulnerable Road User (VRU) or a Pedestrian UE (P-UE) or an on-body or hand-held UE used by public safety personnel and first responders, and referred to as Public safety UE (PS-UE), or an IoT UE, e.g., a sensor, an actuator or a UE provided in a campus network to carry out repetitive tasks and needing input from a gateway node at periodic intervals, or a mobile terminal, or a stationary terminal, or a cellular IoT-UE, or a vehicular UE, or a vehicular group leader (GL) UE, or an IoT or narrowband IoT, NB-IoT, device, a wearable, a reduced capability (RedCap) device, or a ground based vehicle, or an aerial vehicle, or a drone, or a moving base station, or road side unit (RSU), or a building, or any other item or device provided with network connectivity enabling an item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

17. A method for operating a user device (UE) for a wireless communication network, the method comprising:

transmitting or receiving at a plurality of configured or preconfigured opportunities, like a plurality or semi-persistent scheduling (SPS) or configured grant (CG) opportunities; and responsive to one or more criteria, skipping one or more of the SPS or CG opportunities, and wherein the one or more criteria comprise a lack of traffic from or towards the UE.

18. A non-transitory digital storage medium having a computer program stored thereon which, when said computer program is run by a computer, performs a method for operating a user device (UE) for a wireless communication network, the method comprising:

transmitting or receiving at a plurality of configured or preconfigured opportunities, like a plurality or semi-persistent scheduling (SPS) or configured grant (CG) opportunities; and responsive to one or more criteria, skipping one or more of the SPS or CG opportunities, and wherein the one or more criteria comprise a lack of traffic from or towards the UE.

* * * * *